United States Patent [19]
Whitehead et al.

[11] Patent Number: 4,834,495
[45] Date of Patent: May 30, 1989

[54] COLLAPSIBLE LIGHT PIPE

[75] Inventors: Lorne A. Whitehead; Jonathan E. Scott; Malcolm W. Greaves, all of St. Paul, Minn.

[73] Assignee: Minnesota Mining and Manufacturing Company, Saint Paul, Minn.

[21] Appl. No.: 47,642

[22] Filed: May 8, 1987

[51] Int. Cl.⁴ .......................... G02B 7/02; G02B 6/00
[52] U.S. Cl. .............................. 350/96.28; 350/96.10; 350/96.24; 350/265
[58] Field of Search ............... 350/96.10, 96.28, 96.29, 350/96.32, 96.24, 265, 286

[56] References Cited

U.S. PATENT DOCUMENTS

| | | | |
|---|---|---|---|
| 3,196,738 | 7/1965 | Hicks, Jr. | 350/96.29 |
| 3,740,112 | 6/1973 | Lundgren | 350/96.28 |
| 4,120,565 | 10/1978 | Rabl | 350/286 |
| 4,154,219 | 5/1979 | Gupta et al. | 126/270 |
| 4,260,220 | 4/1981 | Whitehead | 350/96.28 |
| 4,615,579 | 10/1986 | Whitehead | 350/96.10 |

Primary Examiner—William L. Sikes
Assistant Examiner—Akm E. Ullah
Attorney, Agent, or Firm—Donald M. Sell; Stephen W. Buckingham

[57] ABSTRACT

A prism light guide luminaire of flexible materials which may be collapsed into a flat state for shipping but easily expanded into a tube for use.

7 Claims, 2 Drawing Sheets

COLLAPSIBLE LIGHT PIPE

TECHNICAL FIELD

The present invention relates to luminaires and more particularly to luminaires which may be collapsed to a compact form for shipping.

BACKGROUND ART

U.S. Pat. No. 4,615,579 teaches the use of a prism light guide as a luminaire. A prism light guide is a tube the walls of which comprise a clear layer, typically of a polymer substance, having a smooth surface and a structured surface. The structures on the structured surface are typically linear, triangular prisms. The material forming such a layer is often known as a total internal reflection film because light is conducted along a tube formed of such a film by total internal reflection from the prisms. In a preferred embodiment, such prisms form isosceles right triangles, although other shapes may be used. In constructing a prism light guide such a polymer film is formed into a tube having the smooth surface facing towards the interior of the tube and the prisms on the outer surface running parallel to the axis of the tube. When such a light guide is to be used as a luminaire, additional layers such as reflectors to ensure the light comes out in a desired direction and diffusers to provide a more pleasing light distribution and appearance may be included.

The luminaire of U.S. Pat. No. 4,615,579 provides a number of advantages over prior art luminaires. A major advantage is that it may be used as an extended light source having excellent uniformity of light distribution. A disadvantage of such a luminaire, however, lies in its rigid construction. Due to its rigid construction it is very bulky making shipment of such luminaires more difficult.

DISCLOSURE OF INVENTION

In the present invention a prism light guide luminaire is constructed of flexible materials. The luminaire is constructed such that it may be collapsed to lay flat for shipping, but easily expanded into a tube for use as a luminaire.

DETAILED DESCRIPTION

Figure 1:
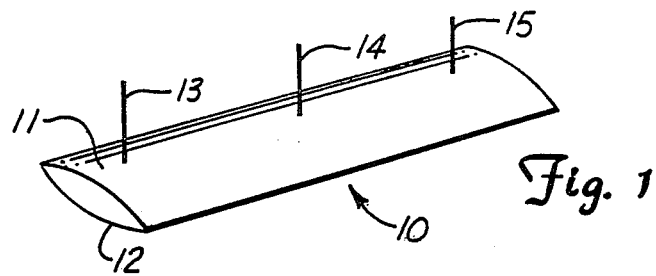
FIG. 1 is a drawing of a luminaire of the invention.

FIG. 1 shows a collapsible light pipe 10 expanded for use as a luminaire. Collapsible light pipe 10 comprises an upper surface 11 and a lower surface 12 and support members 13, 14, and 15 for hanging such a collapsible pipe in place for use. The number of support members may, of course, vary depending on the length of the light pipe and the rigidity of te material used. Typically light sources not shown, would direct light into luminaire 10 from one or both of its ends.

Figure 2:
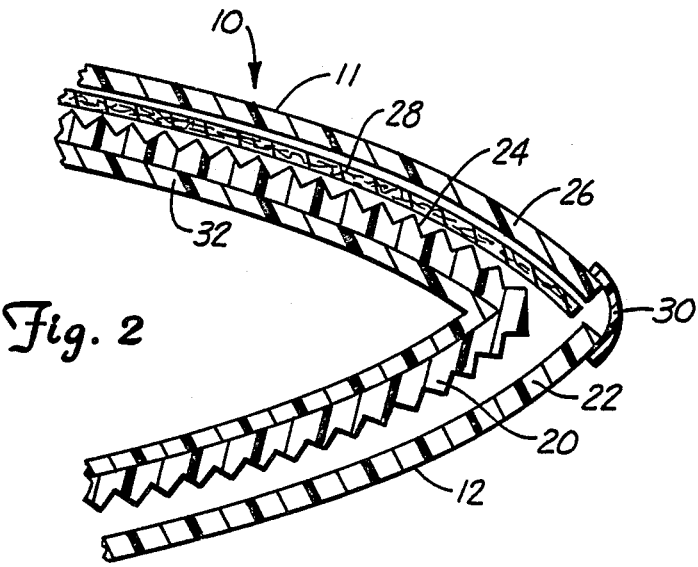
FIG. 2 is an expanded view of a portion of the luminaire of the invention.

FIG. 2 shows an expanded cross-sectional view of a portion of light pipe 10. Lower surface 12 includes total internal reflection film 20 and light diffuser 22. Light diffuser 22 may, for example, be a diffuse polycarbonate film. The prisms on the structured side of the internal reflection film 20 run parallel to the axis of the tube formed by surfaces 11 and 12. The smooth side of the film faces the interior of the tube while the structured side faces the exterior.

Similarly, upper portion 11 includes total internal reflection film 24 and diffuser 26. Additionally, upper portion 11 may include a reflective medium 28. Preferably reflective medium 28 is a dielectric fibrous material such as paper. Bonded nonwoven polyolfin fibrous material has proven to be a particularly effective material for such a reflective medium. Diffusers 22 and 26 are fastened to one another by an adhesive backed material 30. Adhesive backed material 30 may, for example, be PVC tape. Similarly diffusers 22 and 26 would be joined on the other side of luminaire 10.

The structure shown in FIG. 2 will normally lay flat, thus occupying a minimum space of shipping. When hung from supports 13, 14, and 15 of FIG. 1, however, it will sag into an open shape as shown in FIG. 2. If, however, luminaire 10 does not assume the particularly desired shape a rigid support member 32 may be inserted to force luminaire 10 into the desired shape. Alternatively rigid support member 32 may be external to luminaire 10. Rigid support member 32 would typically be a wire hoop having the proper shape. One or more of such hoops may be used as required to cause the luminaire 10 to retain the desired cross-sectional shape. If supports such as rigid support member 32 are used to force the luminaire into a particular shape, any method of suspension may be used, rather than hanging the luminaire from supports 13, 14, and 15. For example, luminaire 10 may be suspended from its edges.

Figure 3:
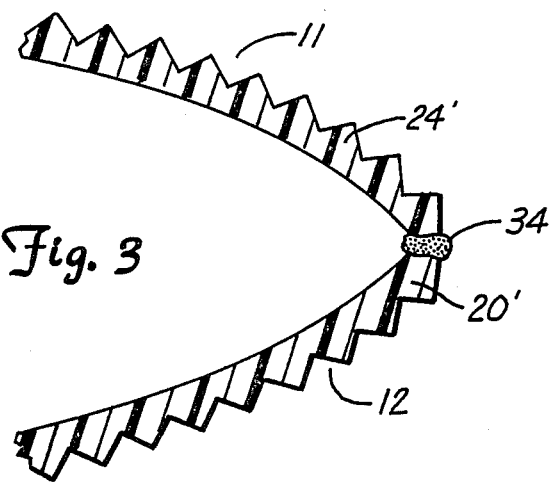
FIG. 3 is an expanded view of a portion of a luminaire according to a first alternative embodiment of the invention.

FIG. 3 illustrates an alternative embodiment for use when there is no preferred direction of light emission. In the system of FIG. 3, luminaire 10 includes a lower portion 12 consisting of a flexible total internal reflection film 20'. Upper portion 11 is formed by a flexible total internal reflection film 24'. Total internal reflection films 20' and 24' are joined to one another by bond 34. Bond 34 could be a weld or an adhesive material. Alternatively an adhesive backed tape such as tape 30 of FIG. 2 could be used. If desired, the luminaire of FIG. 3 could include light diffusers similar to light diffusers 22 and 26 of FIG. 2. As in the system of FIG. 2, the luminaire of FIG. 3 will collapse to a flat structure for shipping but will expand to form a luminaire when hung as from supports 13, 14 and 15 of FIG. 1. Furthermore, as in the luminaire of FIG. 2, an internal brace may be used, if necessary, to ensure that the luminaire of FIG. 3 has a desired shape.

Figure 4:
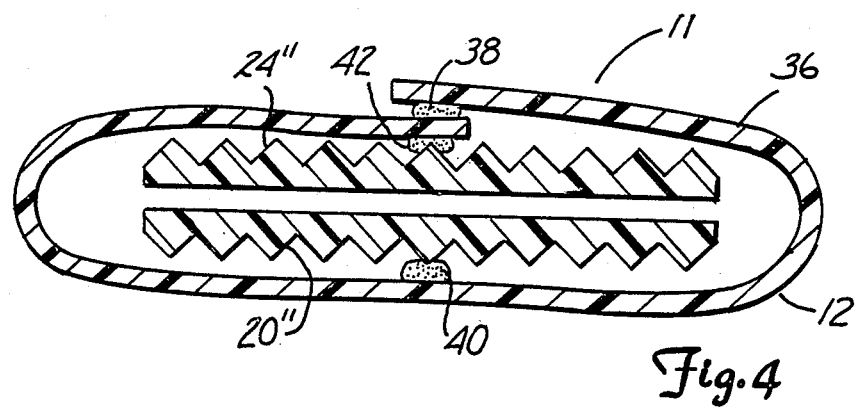
FIG. 4 is a view of a portion of a luminaire according to a second alternative embodiment of the invention collapsed for shipping.

FIG. 4 shows an alternative embodiment of the invention collapsed for shipping. In the embodiment of FIG. 4 a single diffuser 36 is wrapped to form a tube and its edges are joined by bond 38. Total internal reflection films 20" and 24" are inside diffuser 36 and adhered thereto by bonds 40 and 42, respectively. Total internal reflection films 20" and 24" are narrower than the tube formed by diffuser 36. This permits preferential light emission to the sides of the luminaire. If no such preferential lumination is desired, total internal reflection films 20" and 24" could be made as wide as the tube formed by diffuser 36.

Another advantage of the luminaire of FIG. 4 relates to the fact that total internal reflection films 20" and 24" are bonded to diffuser 36 only at points 40 and 42. This permits the total internal reflection film and the diffuser to slide horizontally relative to one another. Thus such luminaires may be rolled into a cylindrical shape for shipping or storage, if desired.

Figure 5:
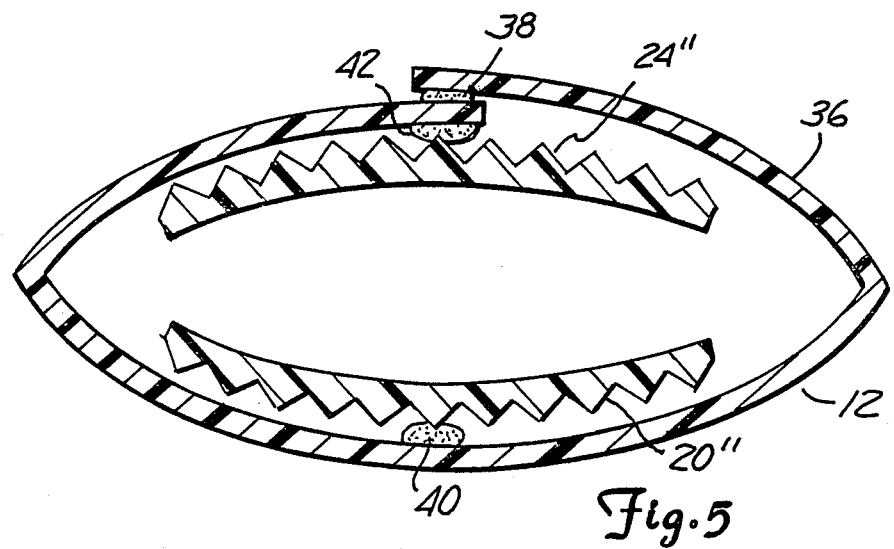
FIG. 5 is a view of a portion of the luminaire of FIG. 4 expanded into its desired operational cross-sectional shape.

FIG. 5 shows the luminaire of FIG. 4 expanded to its operational cross-section. As in the luminaire of FIG. 2 internal supports may be utilized to ensure that the luminaire has a desired cross-section when expanded.

We claim:

1. A light distribution structure in the form of a tube having an axis and comiprising a first and a second side, each of said sides including a flexible transparent film having a structured surface and a smooth surface, said structured surface of each film having a plurality of triangular prisms running parallel to said tube axis and facing the exterior of said tube, said tube being capable of being collapsed to a flat state for shipping and expanded into a desired cross-sectional shape for use.

2. The light distribution structure of claim 1 further comprising a light diffusing film adjacent and external to said first side of said tube.

3. The light distribution structure of claim 1 further comprising reflective means adjacent and external to said second side of said tube.

4. The light distribution structure of claim 3 wherein said reflective means is of a fibrous dielectric material.

5. The light distribution structure of claim 4 wherein said reflective means is of a bonded nonwoven polyolfin material.

6. The light distribution structure of claim 1 wherein said transparent films each have first and second edges running parallel to said prisms, said first edges being attached to one another by means of an adhesive and said second edges being attached to one another by means of an adhesive.

7. The light distribution structure of claim 1 further comprising a first light diffusing film adjacent and external to said first side of said tube and a second light diffusing film adjacent and external to said second side of said tube.

* * * * *